W. JONES.
APPARATUS FOR THE PURIFICATION OF SEWAGE AND ANALOGOUS LIQUIDS.
APPLICATION FILED NOV. 7, 1916.

1,282,587.

Patented Oct. 22, 1918.

Inventor:
Walter Jones
By
Atty.

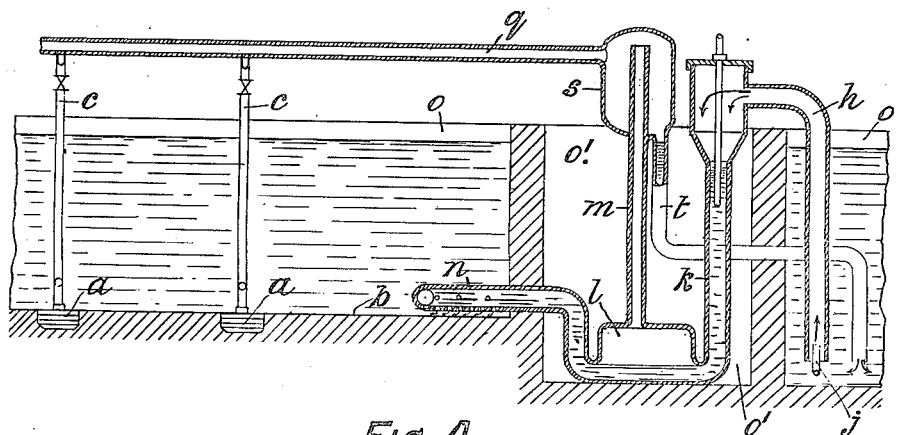
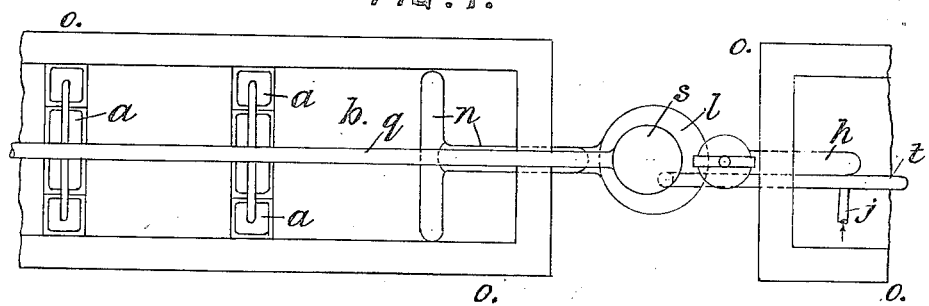

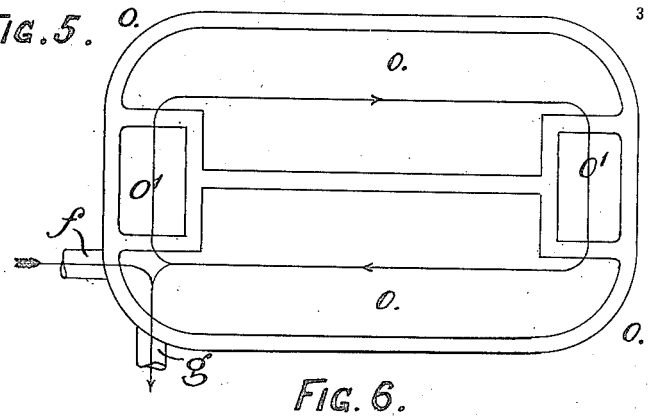
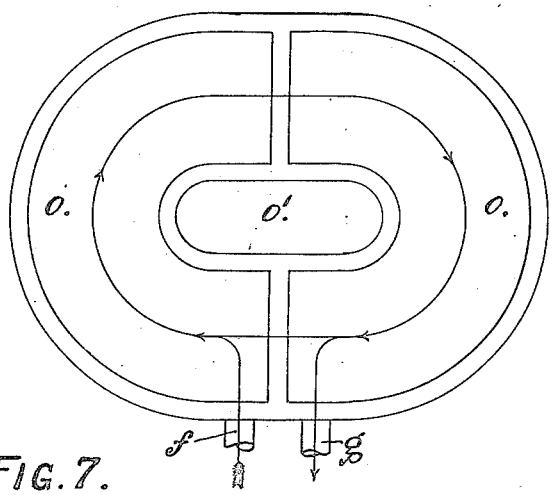
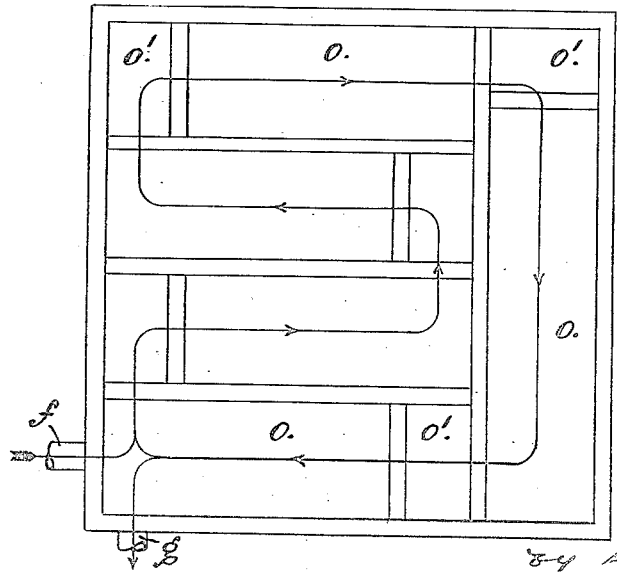

UNITED STATES PATENT OFFICE.

WALTER JONES, OF STOURBRIDGE, ENGLAND.

APPARATUS FOR THE PURIFICATION OF SEWAGE AND ANALOGOUS LIQUIDS.

1,282,587. Specification of Letters Patent. Patented Oct. 22, 1918.

Original application filed October 9, 1914, Serial No. 865,890. Divided and this application filed November 7, 1916. Serial No. 130,042.

*To all whom it may concern:*

Be it known that I, WALTER JONES, a subject of the King of England, residing at Amblecote, Stourbridge, in the county of Stafford, England, have invented new and useful Improvements in or Connected with Apparatus for the Purification of Sewage and Analogous Liquids, of which the following is a specification.

This invention has reference to systems for the purification of sewage and analogous impure liquids in which the purification is effected by the action of aerobic bacteria, or other similar forms of germ life, upon the sewage or liquid, and oxygen—most conveniently that contained in air—is introduced into and combined with the sewage or liquid; and it relates moreover to the mode or method of carrying out that system of purification in which the air or oxygen is supplied to the liquid generally at or near the bottom of a tank or chamber in which the sewage or liquid is treated and acted upon by the bacteria; and the liquid above the area of air or oxygen supply is thereby aerated and raised or lifted locally, and then flows laterally; and subsequently, the liquid is permitted to flow downward at another point toward the bottom of the chamber or tank, and is again caused to flow upward locally, so that the bacteria are kept supplied with oxygen, and the combined sewage or liquid and bacterial sludge are kept distributed and in a state of flow or movement. By this means, the sewage and impure liquid, containing the bacteria or germ life (which are associated wholly or to a large extent with the solid matters contained in or carried by the impure liquid, and of the whole bulk of which the proportion is considerable—say from one fifth to one third) are kept highly active and effective, and the process of purifying the sewage is relatively very rapidly performed.

The present invention is a division of my U. S. application #865,890, filed Oct. 9, 1914, and consists of certain features or structural arrangements in apparatus by which the carrying out of this system of treating of sewage or impure liquids, including the circulation and distribution of the bacterial sludge and liquid, advantageously or in an improved manner, is promoted; and it will be described with the aid of the accompanying drawings, which involve improvements hereunder, and illustrate it.

Figure 1:
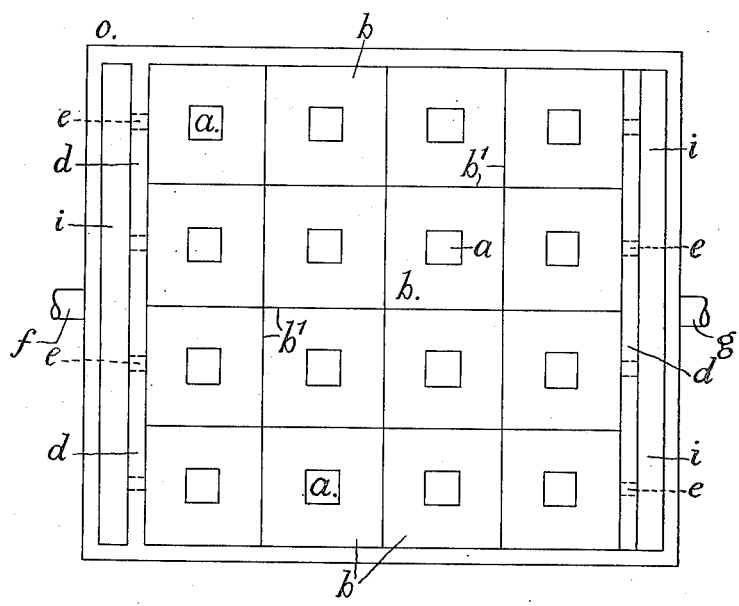
Figure 2:
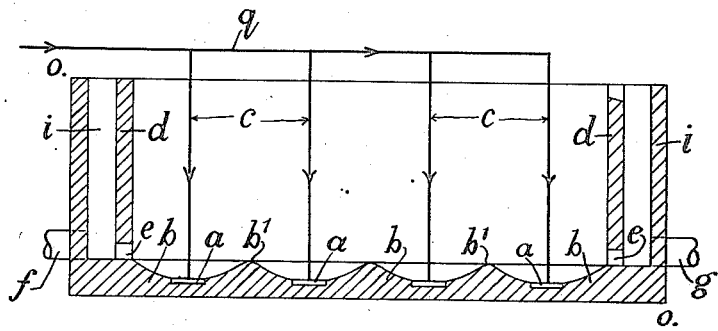

In these drawings, Figure 1 is a plan, and Fig. 2 a longitudinal section of one form of tank or chamber according to the invention; and Figs. 3 and 4 are respectively a section and plan of a slightly different form, and Figs. 5, 6 and 7 show modified forms of tanks which may be employed in carrying out the invention.

In apparatus according to this invention, air is supplied at one part or point of a tank or chamber, preferably in the bottom or near it, through air distributing means, such as porous tiles or bodies by which the air is diffused, and whereby the liquid and bacterial sludge are caused to flow upward above the area of air supply; and then above this point or near the top of the liquid, it is allowed to flow laterally away from same to another point or place, away from or beyond the upflowing stream of liquid and air, where the bacterial sludge or solid matters can, in the absence of this stream or current, fall down and pass again to the area or point of air supply, and so be freshly supplied with air, and re-circulated and re-distributed.

In some cases these actions and effects are carried out in a single or common chamber or tank; while in other cases they are carried out in a plurality of separate chambers or tanks; in which latter case the sewage or liquid and its bacteria and solid matters are moved from one chamber or tank to another by a pump; and the force or power of operating the pump is in some cases compressed air, acting directly on and with the liquid, and such air is adapted at the same time to supply some of the air or oxygen required for rendering and keeping active and vigorous the bacteria or germ life.

In the apparatus shown, the air is supplied at a plurality of points through air supplying or diffuser bodies $a$ receiving air through pipes, as $q$ and $c$; and this air produces both the lifting or upflow of the liquid, and serves as well to aerate the liquid, or supply it with oxygen.

At one or both sides, of, or all around the air suppliers or diffusers $a$ inclined or curved surfaces are provided which cause the falling or deposited bacterial sludge or solid matters to be directed toward or gravitate to this area or place of air supply, and so be reacted upon, and redistributed.

In the construction shown in Figs. 1 and 2, the purifying chamber or tank $o$ consists of a multiplicity of identical sections or cells, each consisting of an area for air supply $a$, set within the middle of the section or cell; and the bottom $b$ of each section inclines or curves down from surrounding upper ridges $b^1$ constituting the shed lines of each surface or area $b$; so that this surface $b$ in this case is an inclined one in four directions, toward the said diffusers $a$, and in the case shown there are a plurality of these sections in both directions, laterally. The action in each section or cell is identical, and the upflow and downflow, and re-distribution of liquid and solid matters, will take place practically as if vertical partitions (more or less perforated) were used, upon the ridges $b^1$; which, in fact, might be used if desired.

In the arrangement shown in Figs. 3 and 4, air is used for forcing the liquid and sludge from one chamber to another, as in the case shown in Figs. 7 and 8 of the specification of my application for patent under Serial No. 865890, in which use air-forcing means is separate from the air distributer.

Compressed air is delivered by a pipe $j$ into a lift pipe $h$, ascending from near the bottom of one tank or tank section $o$, and discharges into a downtake pipe $k$, in the pump or forcing apparatus chamber or space $o^1$, whence it passes to the liquid distributing pipe $n$ in the second tank or tank section $o$.

Air is liberated from the liquid in the air vessel $l$, and passed up into a chamber $s$, wherein any liquid which separates from it, is returned to the other tank $o$ by a pipe $t$; and then by a pipe $q$ the air passes to the down air pipes $c$ to the air suppliers or diffusers $a$, but those diffusers may be supplied by air direct from a compressed air service as in the arrangement in Figs. 1 and 2.

In the case of a plurality of tanks being used, as in this arrangement in Figs. 3 and 4, the liquid will pass continuously from one tank section or tank $o$ to another, by the air forcing means $j$, $h$, and will therefore have a continuous flow through the system; and as it flows through the tank sections it will be supplied at intervals in its course along the tank, with air from the air suppliers or diffusers $a$, so that the sludge and bacteria are elevated and redistributed and the deposited sludge will flow successively on to the bottom parts $b$, and pass along and come under the action of the air supplied from the successive air suppliers or diffusers $a$.

In the arrangement shown in Figs. 3 and 4 two tank sections $o$ are shown.

It is obvious that the process of circulation may be repeated indefinitely, as indicated by the continuous arrow lines in Figs. 5, 6 and 7, or the liquid may be drawn off after one circulation of the tank channels, as indicated by the terminals on the arrow line through the discharge pipes $g$.

It is obvious that the process of circulation may be repeated indefinitely, as indicated by the continuous arrow lines in Figs. 5, 6 and 7; or the liquid may be drawn off after one circulation of the tank channels or sections as indicated by the terminals in arrow lines through the discharge pipes $g$.

In these tanks shown in Figs. 3, 4, 5, 6, and 7 the air suppliers or diffusers $a$ will be presumed to be extended across the tanks or channels $o$, and in the floor of same; and the number of these diffusers will be according to the length of the tank or tank section, and the bottom formation will be constructed and formed as above set forth.

It will be understood that the various pipes, passages, or conduits will have suitable valves connected with them, by which the flow, supply, and discharge of liquid to and from the apparatus, and between the different parts, may be controlled.

In the apparatus shown in Figs. 1 and 2 the sewage or like liquid enters the tank through a pipe $f$ into a narrow well or chamber $i$ between the main tank wall, and the inner wall $d$, in the bottom of which, apertures $e$ are provided opposite each of the different series of porous bodies $a$; while on the discharge side a similar inner wall $d$ is provided; and this latter wall $d$ is lower than the main containing walls of the tank, so that the discharge of purified fluid can, if desired, take place over it, into the discharge well $i$; the purified liquid leaving this discharge well $i$ through the pipe $g$; so that in this case, and by this construction, the liquid will pass continuously through the apparatus from inlet to outlet. This wall also has apertures $e$ in it at the lower part; and when desired the liquid can be discharged through these lower openings, as will be the case when the tank is first filled, then treated with air, and then emptied.

When the supply of compressed air is periodically stopped prior to the discharge of purified liquid, a period of rest may be given to allow the solids and bacteria to precipitate; and only that liquid will be run off through the discharge apertures $e$, which does not contain such solids, and this should be done quietly. Afterward the tank will be filled up and aeration will recommence.

What is claimed is:—

1. In an apparatus for purifying sewage, comprising a tank, means for introducing air or oxygen at the lower part of the tank, said tank being of a size above the air-introducing means to provide a material-receiving area above and laterally of such means and beyond the direct influence of the air from such means.

2. In an apparatus for purifying sewage, comprising a tank, means for introducing air or oxygen at the lower part of the tank, said tank being of a size above the air-introducing means to provide a material-receiving area above and laterally of such means and beyond the direct influence of the air from such means, the tank being inclined adjacent and laterally of the air introducing means to induce a flow of material to such means from that portion of the tank beyond the influence of such means.

3. In an apparatus for purifying sewage, comprising a tank, means for introducing air or oxygen at the lower part of the tank, said tank being of a size above the air-introducing means to provide a material-receiving area above and laterally of such means and beyond the direct influence of the air from such means, and means for drawing off the liquid from such area beyond the direct influence of the air-introducing means.

4. Apparatus for purifying sewage or like liquid comprising a plurality of chambers; means for introducing air or oxygen at the lower part of said chambers; and means for forcing the liquid from one chamber to another; substantially as set forth.

5. Apparatus for purifying sewage or like liquid, comprising a plurality of chambers; means for introducing air or oxygen at the lower part of said chambers; and means for forcing the sewage or liquid from and back to said chambers; substantially as set forth.

6. Apparatus for purifying sewage or like liquid, comprising a plurality of chambers; means for introducing air or oxygen into the liquid at the lower part of said chambers, said air being adapted to force the liquid from one chamber to another; substantially as set forth.

7. Apparatus for purifying sewage or like liquid, comprising a plurality of chambers; a conduit forming a communication between said chambers; and means for introducing air into said conduit so as to aerate the liquid and force it from one chamber to another; substantially as set forth.

8. In apparatus for purifying sewage, a chamber; a plurality of air supply devices in the bottom of the chamber separated a substantial distance from one another, a surface between said air supply devices without air supply means, adapted to cause the material deposited thereon to pass to and above air supply devices; substantially as set forth.

In testimony whereof I have signed my name to this specification in the presence of two subscribing witnesses.

WALTER JONES.

Witnesses:
ARTHUR BUTWELL,
WILLIAM E. HAND.